(12) United States Patent
Xu et al.

(10) Patent No.: US 11,075,593 B2
(45) Date of Patent: Jul. 27, 2021

(54) INERTIAL PIEZOELECTRIC ACTUATOR DRIVEN BY SYMMETRICAL SAWTOOTH WAVE AND METHOD FOR ACHIEVING BI-DIRECTIONAL MOTION THEREOF

(71) Applicant: XI'AN JIAOTONG UNIVERSITY, Shaanxi (CN)

(72) Inventors: Minglong Xu, Shaanxi (CN); Yan Shao, Shaanxi (CN); Bo Feng, Shaanxi (CN)

(73) Assignee: XI'AN JIAOTONG UNIVERSITY, Xi'an (CN)

( * ) Notice: Subject to any disclaimer, the term of this patent is extended or adjusted under 35 U.S.C. 154(b) by 0 days.

(21) Appl. No.: 17/096,868

(22) Filed: Nov. 12, 2020

(65) Prior Publication Data

US 2021/0143757 A1 May 13, 2021

(30) Foreign Application Priority Data

Nov. 13, 2019 (CN) .......................... 201911107770.5

(51) Int. Cl.
*H02N 2/06* (2006.01)
*H02N 2/02* (2006.01)

(52) U.S. Cl.
CPC ............. *H02N 2/065* (2013.01); *H02N 2/025* (2013.01)

(58) Field of Classification Search
CPC .............................. H02N 2/065; H02N 2/025
See application file for complete search history.

(56) References Cited

U.S. PATENT DOCUMENTS

2018/0359577 A1* 12/2018 Kotiya ................... H04R 17/10

FOREIGN PATENT DOCUMENTS

| CN | 204190647 U | 3/2015 |
|---|---|---|
| CN | 104868780 A | 8/2015 |
| CN | 108111053 A | 6/2018 |
| JP | S58105426 A | 6/1983 |

OTHER PUBLICATIONS

«2016 Symposium on Pezoelectricity,Acoustic Waves,and Device Applications(SPAWDA)»;Dynamic Responses of Piezoelectric Inertia Friction Motors With Different Friction Models;Ya-hui Zhao,Li-ling Hian,Rui Zhang,Cheng-liang Pan,Lian-dong Yu.
«Journal of Changchun University of Technology» ;Current situation and development of piezoelectric stick-slip actuator;Cheng Tinghai,Gao Qi,Li Yikang,Li Hengyu,He Meng,Lu Xiaohui.

* cited by examiner

*Primary Examiner* — Emily P Pham

(57) ABSTRACT

An inertial piezoelectric actuator driven by symmetrical sawtooth wave is symmetrical in structure and includes a seat, a slider, a piezoelectric stack and an elliptical ring. A pair of leaf-shaped flexible beams are arranged at a front end of a base, and a guide rail is connected between the pair of leaf-shaped flexible beams. The slider is placed on the guide rail. The piezoelectric stack is arranged in the elliptical ring with an interference fit. A front end of the elliptical ring is in contact with the guide rail, and a pre-stressed contact force between the elliptical ring and the guide rail is controlled by adjusting a screw at a rear end of the elliptical ring. A method for method for actuating bi-directional motion of the inertial piezoelectric actuator is further provided.

5 Claims, 5 Drawing Sheets

INERTIAL PIEZOELECTRIC ACTUATOR DRIVEN BY SYMMETRICAL SAWTOOTH WAVE AND METHOD FOR ACHIEVING BI-DIRECTIONAL MOTION THEREOF

CROSS-REFERENCE TO RELATED APPLICATIONS

This application claims the benefit of priority from Chinese Patent Application No. 201911107770.5, filed on Nov. 13, 2019. The content of the aforementioned application, including any intervening amendments thereto, is incorporated herein by reference in its entirety.

TECHNICAL FIELD

The present application relates to inertial piezoelectric actuators, and more particularly to an inertial piezoelectric actuator driven by symmetrical sawtooth wave and a method for actuating bi-directional motion thereof.

BACKGROUND

Generally, inertial piezoelectric actuators are controlled through asymmetric drive signals, asymmetric mechanical clamp structures or asymmetric frictions, and realize the output based on inertial forces and friction forces of moving blocks.

The inertial piezoelectric actuator is advantageous over other types of piezoelectric actuators. For example, the inertial piezoelectric actuator has a simple structure, a high response speed, a high resolution, a long stroke and low cost. In addition, nano-level positioning accuracy can be achieved while having a long stroke. Therefore, the inertial piezoelectric actuator is applicable for occasions that require a high resolution and a long stroke. At present, the inertial piezoelectric actuator has been successfully applied to high-precision positioning mechanisms, multi-degree-of-freedom drives, joints of micro-robots, and micro-manipulators.

Generally, the inertial piezoelectric actuators are driven by asymmetric sawtooth waves. However, such waves require power amplifiers to have good output performance, which increases the difficulty of driving and control. Besides, it is complicated for the existing inertial piezoelectric actuator to reduce the step distance through the reduction of the drive voltage. The obtained step resolution which is often several hundred microns cannot be further improved, and it is difficult to stably output the minimum step distance.

SUMMARY

In order to solve the above-mentioned problems in the prior art, the present disclosure aims to provide an inertial piezoelectric actuator driven by symmetrical sawtooth wave and a method for actuating bi-directional motion thereof. Under the drive of the symmetrical sawtooth wave, the inertial piezoelectric actuator combines the characteristic of inconsistent response of the displacement transmitted by the contact surface and the stick-slip actuating principle, which can respond quickly and achieve stable bi-directional output by controlling the frequency. The inertial piezoelectric actuator is compact in structure, easy to process and mount, and controllable in direction. In addition, it can carry out the actuating fast and accurately, and has high resolution and stable output.

The present disclosure provides an inertial piezoelectric actuator driven by symmetrical sawtooth wave, the inertial piezoelectric actuator being symmetrical and comprising:
a seat;
a slider;
a piezoelectric stack; and
an elliptical ring;
wherein the seat is integrally formed and comprises a base, a pair of leaf-shaped flexible beams and a guide rail; the pair of leaf-shaped flexible beams are arranged at a front end of the base, and the guide rail is connected between the pair of leaf-shaped flexible beams; the slider is placed on the guide rail, and a friction is generated between the slider and the guide rail due to a gravity of the slider; the piezoelectric stack is arranged in the elliptical ring along a major diameter of the elliptical ring with an interference fit; a front end of the elliptical ring is in contact with the guide rail, and a pre-stressed contact force between the elliptical ring and the guide rail is controlled by adjusting a screw at a rear end of the elliptical ring; when the piezoelectric stack is driven by a symmetric sawtooth wave, the elliptical ring is driven by the piezoelectric stack, so as to output a sawtooth wave of a displacement that periodically changes.

A through hole is provided at the rear end of the elliptical ring, wherein a diameter of the through hole is larger than an outer diameter of the screw; during mounting, the screw passes through the through hole at the rear end of the elliptical ring and is connected to the base, and a position of the elliptical ring is finely adjusted along the major diameter to allow the front end of the elliptical ring and an end surface of the guide rail to contact with each other; the elliptical ring is continued to be pushed forward to allow the front end of the elliptical ring and the end surface of the guide rail to press each other to generate the pre-stressed contact force; and when an adjustment is completed, the screw is tightened to fix the position of the elliptical ring in the major diameter.

A groove having the same width as the rear end of the elliptical ring is provided on the base; during an adjustment of a position of the elliptical ring along the major diameter, the rear end of the elliptical ring slides along inner walls of the groove of the base, so as to ensure that the front end of the elliptical ring is parallel to the end surface of the guide rail.

When the piezoelectric stack is driven by a symmetrical sawtooth wave, the elliptical ring is capable of rapidly achieving real-time displacement response under the drive of the piezoelectric stack, and outputs a sawtooth wave in which the displacement changes periodically. In each cycle of the symmetrical sawtooth wave, the displacement comprises a rising phase from zero to a maximum value and a falling phase from the maximum value to zero; at zero and the maximum value, the displacement has a turning point of zero and a turning point of the maximum value which are sharp, and acceleration steps from zero to peaks; at this time, an increase of a frequency of an actuating voltage causes that the turning point of the maximum value and the turning point of zero of the displacement are sharper and the acceleration of the peaks is greater; the elliptical ring outputs the displacement which is transmitted to the guide rail through a contact surface of the elliptical ring and the guide rail; at this time, the guide rail is subject to a contact force of the elliptical ring and the guide rail, an elastic force of the pair of leaf-shaped flexible beams, and an inertial force generated during the movement of the guide rail.

It should be noted that when the front end of the elliptical ring and the end surface of the guide rail are separated from each other or in a critical contact state, the contact force is zero; when the front end of the elliptical ring and the end surface of the guide rail press each other, the contact force is generated and is expressed as a pressure; an extending direction of the piezoelectric stack is taken as a positive direction, and a response of the guide rail at the turning point of the maximum value is related to the frequency of the actuating voltage; at the turning point of the maximum value, acceleration of the elliptical ring reaches a negative acceleration peak, and at this time, only when the elastic force of the pair of leaf-shaped flexible beams received by the guide rail overcomes the inertial force of the guide rail and the contact force, the guide rail is able to tightly follow the elliptical ring to move; when the actuating voltage is at a low frequency, the guide rail needs to overcome a small inertial force; under a preset rigidity of the pair of leaf-shaped flexible beams, the guide rail follows the elliptical ring to move, and a sharp turning point of the maximum value of a displacement of guide rail is realized;

as the frequency of the actuating voltage increases, the negative acceleration peak of the elliptical ring increases, and the inertial force that the guide rail needs to overcome increases to follow the elliptical ring; there is a critical frequency; when the frequency of the actuating voltage is greater than the critical frequency, the guide rail fails to deform with the elliptical ring since the elastic force is limited; at the turning point of the maximum value, the response of the guide rail is smoother than that of the elliptical ring; after the turning point of the maximum value, the response of the guide rail lags behind the displacement of the elliptical ring; when the response of the guide rail greatly lags behind the displacement of the elliptical ring, the end surface of the guide rail and the front end of the elliptical ring are separated temporarily in the falling phase;

in like manner, the response of the guide rail at the turning point of zero is also related to the frequency of the actuating voltage; at the turning point of zero, the acceleration of the elliptical ring reaches a positive acceleration peak, and the guide rail overcomes the elastic force of the pair of leaf-shaped flexible beams and the inertial force generated during the movement of the guide rail through the contact force to follow the elliptical ring to move; when the actuating voltage is at a low frequency, the inertial force that the guide rail needs to overcome is relatively small; with sufficient pre-stressed contact force, the guide rail follows the elliptical ring to move, and a sharp turning point of zero of the displacement of the guide rail is realized;

as the frequency of the actuating voltage increases, the positive acceleration peak of the elliptical ring increases, and the inertial force that the guide rail needs to overcome increases to follow the elliptical ring to move; at this time, there is a frequency to allow a response of the guide rail at the turning point of zero to be smoother than that of the elliptical ring; it should be noted that when the frequency of the actuating voltage is increased to cause the end surface of the guide rail and the front end of the elliptical ring to separate from each other in the falling phase, the elliptical ring passes the turning point of zero before the guide rail, to start a rising phase of a next cycle of the symmetrical sawtooth wave, and the guide rail is still in the falling phase of this cycle; a collision occurs between the elliptical ring in the rising phase and the guide rail in the falling phase, so that the displacement of the guide rail has a turning point of a minimum value that is sharp before reaching a zero displacement, and the guide rail follows the elliptical ring to enter the rising phase of the next cycle; and since the elliptical ring and the guide rail are in contact with each other and are not fixed, and the displacement transmission of the elliptical ring and the guide rail is complicated and related to the frequency of the actuating voltage, in the case of the preset rigidity of the pair of leaf-shaped flexible beams and the pre-stressed contact force, the frequency of the actuating voltage is adjusted, so that the response of the guide rail at the turning point of the maximum value is smoother or sharper than the response at the turning point of the minimum value, so as to drive the slider to move.

The present disclosure further provides a method for achieving bi-directional motion of the inertial piezoelectric actuator. When the inertial piezoelectric actuator is not energized, the slider being statically placed on the guide rail, and being in a clamp state since the gravity of the slider allows a friction to be generated between the slider and the guide rail;

a frequency of an actuating voltage being adjusted to allow a response of the guide rail at a turning point of a maximum value to be sharper than the response of the guide rail at a turning point of a minimum value, so as to make the slider move forward; the method comprising:

1) energizing the piezoelectric stack from a zero voltage to a full stroke voltage to make the guide rail to move forward; wherein a displacement of the guide rail at the turning point of the minimum value is relatively smooth, and a positive acceleration is relatively small; a static friction force received by the slider provides the inertial force to allow the slider and the guide rail to remain relatively stationary; the slider and the guide rail are relative static and move forward together; when the piezoelectric stack is energized to the full stroke voltage, the slider moves forward a first distance;

2) energizing the piezoelectric stack from the full stroke voltage to the zero voltage to make the guide rail to move backward; wherein the displacement of the guide rail at the turning point of the maximum value is relatively sharp, and a negative acceleration is relatively large; a static friction force received by the slider fails to provide the inertial force to allow the slider and the guide rail to remain relatively stationary; the slider slides on the guide rail and continuously accelerates by sliding friction until a moving speed of the slider is equal to that of the guide rail, so that the slider and the guide rail remain relatively static; when the piezoelectric stack is energized to the zero voltage, the slider moves backward a second distance;

wherein the second distance is smaller than the first distance, and a difference between the first distance and the second distance is a step distance that the slider moves forward in this cycle; and 3) repeating the steps 1-2 to allow the slider to continuously move forward;

the frequency of the actuating voltage being adjusted to allow the response of the guide rail at the turning point of the maximum value to be smoother than the response of the guide rail at the turning point of the minimum value, so as to make the slider move backward; the method comprising:

1) energizing the piezoelectric stack from a zero voltage to a full stroke voltage to make the guide rail to move forward; wherein the displacement of the guide rail at the turning point of the minimum value is relatively sharp, and the positive acceleration is relatively large; the static friction force received by the slider fails to provide the inertial force to allow the slider and the guide rail to remain relatively stationary; the slider slides on the guide rail, and continuously accelerates until the moving speed of the slider is equal to that of the guide rail, so that the slider and the guide rail remain relatively static; when the piezoelectric stack is energized to the full stroke voltage, the slider moves forward a third distance;

2) energizing the piezoelectric stack from the full stroke voltage to the zero voltage to make the guide rail to move backward; wherein the displacement of the guide rail at the turning point of the maximum value is relatively smooth, and a negative acceleration is relatively small; a static friction force received by the slider provides the inertial force to allow the slider and the guide rail to remain relatively stationary; when the piezoelectric stack is energized to the zero voltage, the slider moves backward a fourth distance;

wherein the fourth distance is greater than the third distance, and a difference between the third distance and the fourth distance is the step distance that the slider moves backward in this cycle; and 3) repeating the steps 1-2 to allow the slider to continuously move backward.

Compared to the prior art, the present invention has the following advantages.

The pre-stressed contact force between the guide rail and the elliptical ring can be adjusted by the screw, which facilitates the debugging of the actuator before the operation.

The guide rail can achieve inconsistent displacement response under the symmetrical sawtooth wave voltage, that is, the response of the displacement at the turning points of the maximum and minimum values can be relatively sharp or smooth through the control of the frequency. The transmission of the contact surface causes the inconsistent displacement response, which allows the actuator to output displacement under a symmetrical sawtooth wave.

The slider can realize bi-directional high-precision stepping due to the cooperation of the friction and the drive of the inconsistent displacement of the guide rail. The inconsistent displacement response is resulted from the displacement transmission of the contact surface, which is determined by the structure of the actuator, and thus has precision and stability. Therefore, the resolution of the slider can be improved to the nanometer level while ensuring stable output under a large stroke.

DETAILED DESCRIPTION OF EMBODIMENTS

The application will be further described in detail with reference to the accompanying embodiments.

Figure 1:
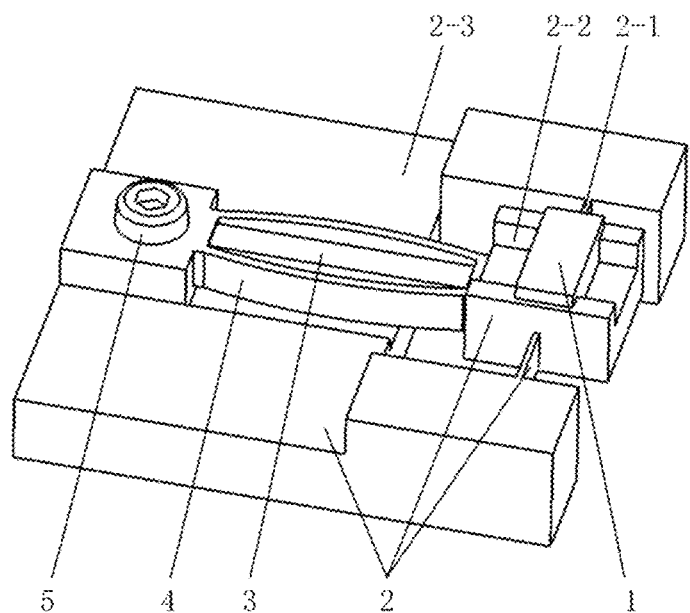
FIG. 1 is a perspective view of an inertial piezoelectric actuator driven by a symmetrical sawtooth wave according to an embodiment of the present disclosure.
Figure 2:
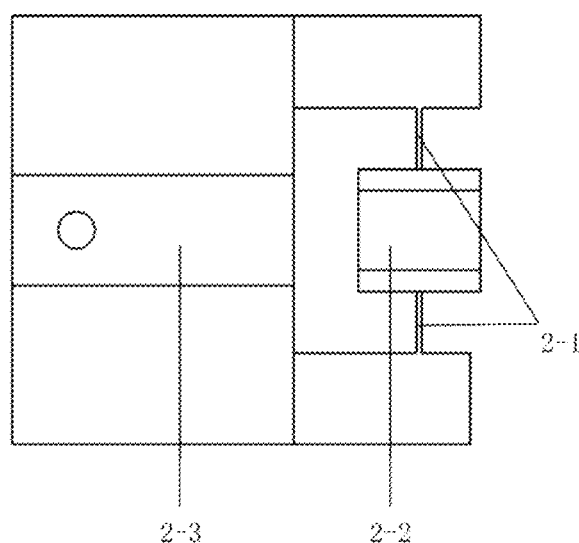
FIG. 2 is a schematic diagram of a seat of the inertial piezoelectric actuator according to an embodiment of the present disclosure.

As shown in FIGS. 1-2, illustrated is an inertial piezoelectric actuator driven by symmetrical sawtooth wave. The inertial piezoelectric actuator is symmetrical in structure and includes a seat 2, a slider 1, a piezoelectric stack 3 and an elliptical ring 4. The seat 2 is integrally formed and includes a base 2-3, a pair of leaf-shaped flexible beams 2-1 and a guide rail 2-2. The pair of leaf-shaped flexible beams 2-1 are arranged at a front end of the base 2-3, and the guide rail 2-2 is connected between the pair of leaf-shaped flexible beams 2-1; the slider 1 is placed on the guide rail 2-2, and a friction is generated between the slider 1 and the guide rail 2-2 due to a gravity of the slider. The piezoelectric stack 3 is arranged in the elliptical ring 4 along a major diameter of the elliptical ring 4 with an interference fit. A front end of the elliptical ring 4 is in contact with the guide rail 2-2, and a pre-stressed contact force between the elliptical ring 4 and the guide rail 2-2 is controlled by adjusting a screw 5 at a rear end of the elliptical ring 4.

In some embodiments, a through hole is provided at the rear end of the elliptical ring 4. A diameter of the through hole is larger than an outer diameter of the screw 5. During mounting, the screw 5 passes through the through hole at the rear end of the elliptical ring 4 and is connected to the base 2-3, and a position of the elliptical ring 4 is finely adjusted along the major diameter to allow the front end of the elliptical ring 4 and an end surface of the guide rail 2-2 to contact with each other. The elliptical ring 4 is continued to be pushed forward to allow the front end of the elliptical ring 4 and the end surface of the guide rail 2-2 to press each other to generate the pre-stressed contact force. When an adjustment is completed, the screw 5 is tightened to fix the position of the elliptical ring 4 in the major diameter.

In some embodiments, a groove having the same width as the rear end of the elliptical ring 4 is provided on the base 2-3. During an adjustment of a position of the elliptical ring 4 along the major diameter, the rear end of the elliptical ring 4 slides along inner walls of the groove of the base 2-3, so as to ensure that the front end of the elliptical ring 4 is parallel to the end surface of the guide rail 2-2.

In some embodiments, when the piezoelectric stack 3 is driven by a symmetrical sawtooth wave, the elliptical ring 4 is capable of rapidly achieving real-time displacement response under the drive of the piezoelectric stack 3, and outputs a sawtooth wave in which a displacement changes periodically. In each cycle of the symmetrical sawtooth wave, the displacement includes a rising phase from zero to a maximum value and a falling phase from the maximum value to zero; at zero and the maximum value, the displacement has a turning point of zero and a turning point of the maximum value which are sharp, and acceleration steps from zero to peaks. At this time, an increase of a frequency of an actuating voltage causes that the turning point of the maximum value and the turning point of zero of the displacement are sharper and the acceleration of the peaks is greater. The elliptical ring 4 outputs the displacement which is transmitted to the guide rail 2-2 through a contact surface of the elliptical ring 4 and the guide rail 2-2. At this time, the guide rail 2-2 is subject to a contact force of the elliptical ring 4 and the guide rail 2-2, an elastic force of the pair of leaf-shaped flexible beams 2-1, and an inertial force generated during the movement of the guide rail.

It should be noted that when the front end of the elliptical ring 4 and the end surface of the guide rail 2-2 are separated from each other or in a critical contact state, the contact force is zero; when the front end of the elliptical ring 4 and the end surface of the guide rail 2-2 press each other, the contact force is generated and is expressed as a pressure; an extending direction of the piezoelectric stack 3 is taken as a positive direction, and a response of the guide rail 2-2 at the turning point of the maximum value is related to the frequency of the actuating voltage. At the turning point of the maximum value, acceleration of the elliptical ring 4 reaches a negative acceleration peak, and at this time, only when the elastic force of the pair of leaf-shaped flexible beams 2-1 received by the guide rail 2-2 overcomes the inertial force of the guide rail and the contact force, the guide rail 2-2 is able to tightly follow the elliptical ring 4 to move. When the actuating voltage is at a low frequency, the guide rail 2-2 needs to overcome a small inertial force. Under a preset rigidity of the pair of leaf-shaped flexible beams 2-1, the guide rail 2-2 follows the elliptical ring 4 to move, and a sharp turning point of the maximum value of a displacement of the guide rail is realized.

As the frequency of the actuating voltage increases, the negative acceleration peak of the elliptical ring 4 increases, and the inertial force that the guide rail 2-2 needs to overcome increases to follow the elliptical ring 4. There is a critical frequency. When the frequency of the actuating voltage is greater than the critical frequency, the guide rail 2-2 fails to deform with the elliptical ring 4 since the elastic force is limited. At the turning point of the maximum value, the response of the guide rail 2-2 is smoother than that of the elliptical ring 4. After the turning point of the maximum value, the response of the guide rail 2-2 lags behind the displacement of the elliptical ring 4. When the response of the guide rail 2-2 greatly lags behind the displacement of the elliptical ring 4, the end surface of the guide rail 2-2 and the front end of the elliptical ring 4 are separated temporarily in the falling phase.

In like manner, the response of the guide rail 2-2 at the turning point of zero is also related to the frequency of the actuating voltage. At the turning point of zero, the acceleration of the elliptical ring 4 reaches a positive acceleration peak, and the guide rail 2-2 overcomes the elastic force of the pair of leaf-shaped flexible beams 2-1 and the inertial force generated during the movement of the guide rail 2-2 through the contact force to follow the elliptical ring 4 to move. When the actuating voltage is at a low frequency, the inertial force that the guide rail 2-2 needs to overcome is relatively small. With sufficient pre-stressed contact force, the guide rail 2-2 follows the elliptical ring 4 to move, and a sharp turning point of zero of the displacement of the guide rail is realized.

As the frequency of the actuating voltage increases, the positive acceleration peak of the elliptical ring 4 increases, and the inertial force that the guide rail 2-2 needs to overcome increases to follow the elliptical ring 4 to move. At this time, there is a frequency to allow a response of the guide rail 2-2 at the turning point of zero to be smoother than that of the elliptical ring 4. It should be noted that when the frequency of the actuating voltage is increased to cause the end surface of the guide rail 2-2 and the front end of the elliptical ring 4 to separate from each other in the falling phase, the elliptical ring 4 passes the turning point of zero before the guide rail 2-2, to start a rising phase of a next cycle of the symmetrical sawtooth wave, and the guide rail 2-2 is still in the falling phase of this cycle. A collision occurs between the elliptical ring 4 in the rising phase and the guide rail 2-2 in the falling phase, so that the displacement of the guide rail 2-2 has a turning point of a minimum value that is sharp before reaching a zero displacement, and the guide rail 2-2 follows the elliptical ring 4 to enter the rising phase of the next cycle.

Since the elliptical ring 4 and the guide rail 2-2 are in contact with each other and are not fixed, and the displacement transmission of the elliptical ring 4 and the guide rail 2-2 is complicated and related to the frequency of the actuating voltage, in the case of the preset rigidity of the pair of leaf-shaped flexible beams 2-1 and the pre-stressed contact force, the frequency of the actuating voltage is adjusted, so that the response of the guide rail 2-2 at the turning point of the maximum value is smoother or sharper than the response at the turning point of the minimum value, so as to drive the slider to move.

The present embodiment further provides a method for achieving bi-directional motion of the inertial piezoelectric actuator. When the inertial piezoelectric actuator is not energized, the slider 1 is statically placed on the guide rail 2-2, and is in a clamp state since the gravity of the slider 1 allows a friction to be generated between the slider 1 and the guide rail 2-2.

Figure 3A:
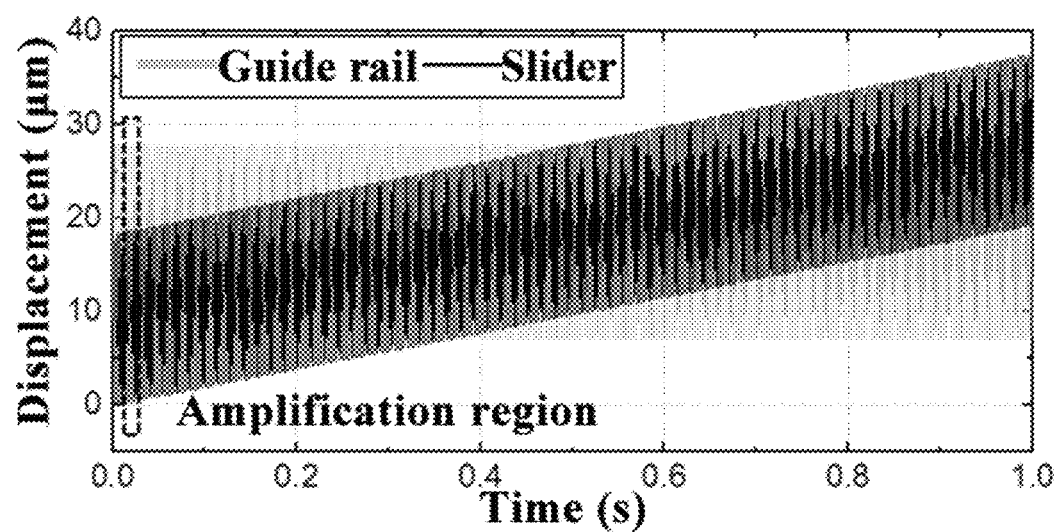
FIG. 3A is a diagram showing the displacement of the guide rail and the slider according to an embodiment of the present disclosure, in which the inertial piezoelectric actuator moves forward.
Figure 3B:
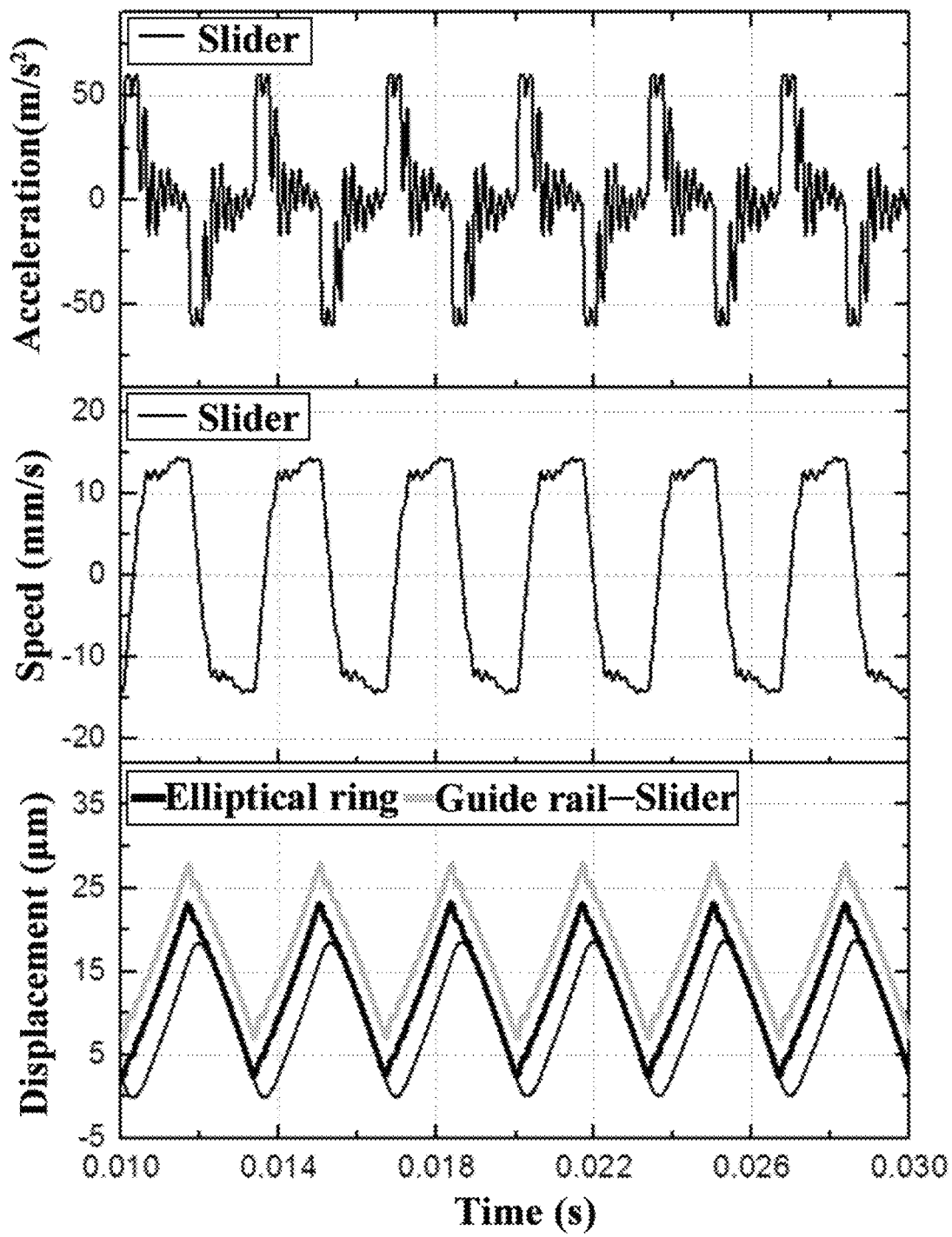
FIG. 3B is a partial enlarged diagram showing the stepping of a forward motion according to an embodiment of the present disclosure.
Figure 4A:
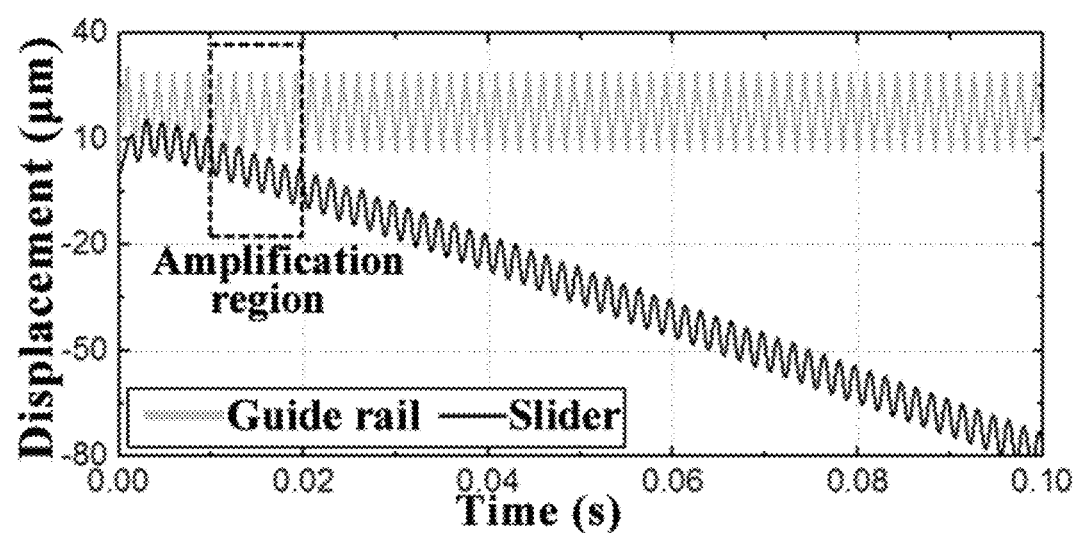
FIG. 4A is a diagram showing the displacement of the guide rail and the slider according to an embodiment of the present disclosure, in which the inertial piezoelectric actuator moves backward.
Figure 4B:
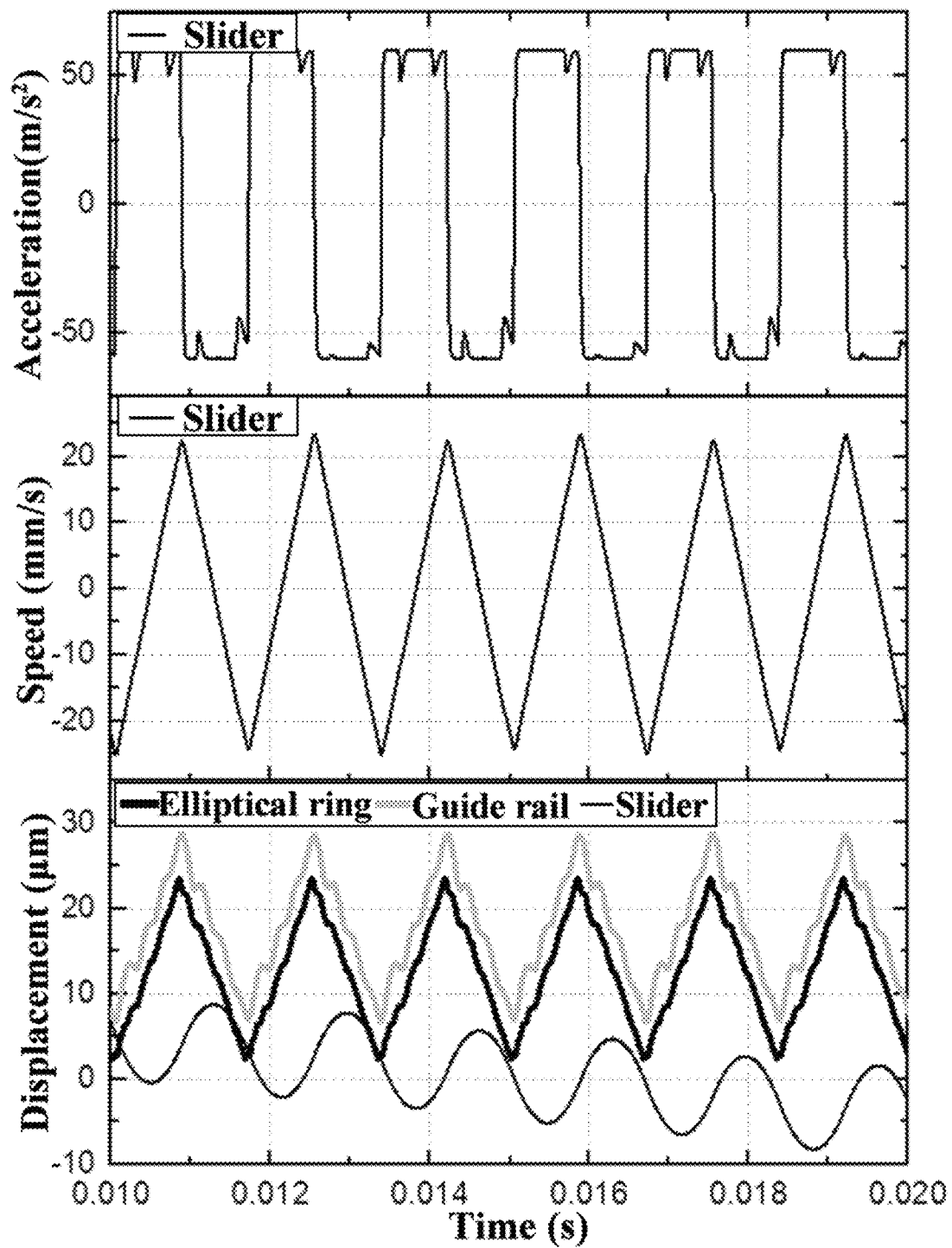
FIG. 4B is a partial enlarged diagram showing the stepping of a backward motion according to an embodiment of the present disclosure.

As shown in FIGS. 3A-B, a frequency of an actuating voltage being adjusted to allow a response of the guide rail 2-2 at a turning point of a maximum value to be sharper than the response of the guide rail 2-2 at a turning point of a minimum value, so as to make the slider 1 move forward. The method includes the following steps.

The piezoelectric stack is energized from a zero voltage to a full stroke voltage to make the guide rail to move forward. A displacement of the guide rail 2-2 at the turning point of the minimum value is relatively smooth, and a positive acceleration is relatively small. A static friction force received by the slider 1 provides the inertial force to allow the slider 1 and the guide rail 2-2 to remain relatively stationary. The slider 1 and the guide rail 2-2 are relative static and move forward together. When the piezoelectric stack 3 is energized to the full stroke voltage, the slider 1 moves forward a first distance.

The piezoelectric stack 3 is energized from the full stroke voltage to the zero voltage to make the guide rail 2-2 to move backward. The displacement of the guide rail 2-2 at the turning point of the maximum value is relatively sharp, and a negative acceleration is relatively large. A static friction force received by the slider 1 fails to provide the inertial force to allow the slider 1 and the guide rail 2-2 to remain relatively stationary; the slider slides on the guide rail 2-2 and continuously accelerates by sliding friction until a moving speed of the slider 1 is equal to that of the guide rail 2-2, so that the slider 1 and the guide rail 2-2 remain relatively static. When the piezoelectric stack 3 is energized to the zero voltage, the slider 1 moves backward a second distance.

The second distance is smaller than the first distance, and a difference between the first distance and the second distance is a step distance that the slider 1 moves forward in this cycle.

The steps 1-2 are repeated to allow the slider 1 to continuously move forward.

The frequency of the actuating voltage is adjusted to allow the response of the guide rail 2-2 at the turning point of the maximum value to be smoother than the response of the guide rail 2-2 at the turning point of the minimum value, so as to make the slider 1 move backward. The method includes the following steps.

The piezoelectric stack 3 is energized from a zero voltage to a full stroke voltage to make the guide rail 2-2 to move forward. The displacement of the guide rail 2-2 at the turning point of the minimum value is relatively sharp, and the negative acceleration is relatively large. The static friction force received by the slider 1 fails to provide the inertial force to allow the slider 1 and the guide rail 2-2 to remain relatively stationary. The slider 1 slides on the guide rail 2-2, and continuously accelerates based on the friction until the moving speed of the slider 1 is equal to that of the guide rail 2-2, so that the slider 1 and the guide rail 2-2 remain relatively static. When the piezoelectric stack 3 is energized to the full stroke voltage, the slider 1 moves forward a third distance.

The piezoelectric stack 3 is energized from the full stroke voltage to the zero voltage to make the guide rail 2-2 to move backward. The displacement of the guide rail 2-2 at the turning point of the maximum value is relatively smooth, and a positive acceleration is relatively small. A static friction force received by the slider 1 provides the inertial force to allow the slider 1 and the guide rail 2-2 to remain relatively stationary. When the piezoelectric stack 3 is energized to the zero voltage, the slider 1 moves backward a fourth distance.

The fourth distance is greater than the third distance, and a difference between the third distance and the fourth distance is the step distance that the slider 1 moves backward in this cycle.

The steps 1-2 are repeated to allow the slider 1 to continuously move backward.

What is claimed is:

1. An inertial piezoelectric actuator driven by symmetrical sawtooth wave, comprising:
   a seat;
   a slider;
   a piezoelectric stack; and
   an elliptical ring;
   wherein the inertial piezoelectric actuator is symmetrical in structure;
   the seat is integrally formed and comprises a base, a pair of leaf-shaped flexible beams and a guide rail; the pair of leaf-shaped flexible beams are arranged at a front end of the base, and the guide rail is connected between the pair of leaf-shaped flexible beams; the slider is placed on the guide rail, and a friction is generated between the slider and the guide rail due to a gravity of the slider; the piezoelectric stack is arranged in the elliptical ring along a major diameter of the elliptical ring with an interference fit; a front end of the elliptical ring is in contact with the guide rail, and a pre-stressed contact force between the elliptical ring and the guide rail is controlled by adjusting a screw at a rear end of the elliptical ring; when the piezoelectric stack is driven by a symmetric sawtooth wave, the elliptical ring is driven by the piezoelectric stack, so as to output a sawtooth wave of a displacement that periodically changes.

2. The inertial piezoelectric actuator of claim 1, wherein a through hole is provided at the rear end of the elliptical ring, wherein a diameter of the through hole is larger than an outer diameter of the screw; during mounting, the screw passes through the through hole at the rear end of the elliptical ring and is connected to the base, and a position of the elliptical ring is finely adjusted along the major diameter to allow the front end of the elliptical ring and an end surface of the guide rail to contact with each other; the elliptical ring is continued to be pushed forward to allow the front end of the elliptical ring and the end surface of the guide rail to press each other to generate the pre-stressed contact force; and when an adjustment is completed, the screw is tightened to fix the position of the elliptical ring in the major diameter.

3. The inertial piezoelectric actuator of claim 1, wherein a groove having the same width as the rear end of the elliptical ring is provided on the base; during an adjustment of a position of the elliptical ring along the major diameter, the rear end of the elliptical ring slides along inner walls of the groove of the base, so as to ensure that the front end of the elliptical ring is parallel to the end surface of the guide rail.

4. The inertial piezoelectric actuator of claim 1, wherein in each cycle of the symmetrical sawtooth wave, the displacement comprises a rising phase from zero to a maximum value and a falling phase from the maximum value to zero; at zero and the maximum value, the displacement has a turning point of zero and a turning point of the maximum value which are sharp, and acceleration steps from zero to peaks; at this time, an increase of a frequency of an actuating voltage causes that the turning point of the maximum value and the turning point of zero of the displacement are sharper and the acceleration of the peaks is greater; the elliptical ring outputs the displacement which is transmitted to the guide rail through a contact surface of the elliptical ring and the guide rail; at this time, the guide rail is subject to a contact force of the elliptical ring and the guide rail, an elastic force of the pair of leaf-shaped flexible beams, and an inertial force generated during the movement of the guide rail;

when the front end of the elliptical ring and the end surface of the guide rail are separated from each other or in a critical contact state, the contact force is zero; when the front end of the elliptical ring and the end surface of the guide rail press each other, the contact force is generated and is expressed as a pressure; an extending direction of the piezoelectric stack is taken as a positive direction, and a response of the guide rail at the turning point of the maximum value is related to the frequency of the actuating voltage; at the turning point of the maximum value, acceleration of the elliptical ring reaches a negative acceleration peak, and at this time, only when the elastic force of the pair of leaf-shaped flexible beams received by the guide rail overcomes the inertial force of the guide rail and the contact force, the guide rail is able to tightly follow the elliptical ring to move; when the actuating voltage is at a low frequency, the guide rail needs to overcome a small inertial force; under a preset rigidity of the pair of leaf-shaped flexible beams, the guide rail follows the elliptical ring to move, and a sharp turning point of the maximum value of a displacement of the guide rail is realized;

as the frequency of the actuating voltage increases, the negative acceleration peak of the elliptical ring increases, and the inertial force that the guide rail needs to overcome increases to follow the elliptical ring; there is a critical frequency; when the frequency of the actuating voltage is greater than the critical frequency, the guide rail fails to deform with the elliptical ring since the elastic force is limited; at the turning point of the maximum value, the response of the guide rail is smoother than that of the elliptical ring; after the turning point of the maximum value, the displacement response of the guide rail lags behind the displacement of the elliptical ring; when the response of the guide rail greatly lags behind the displacement of the elliptical ring, the end surface of the guide rail and the front end of the elliptical ring are separated temporarily in the falling phase;

the response of the guide rail at the turning point of zero is related to the frequency of the actuating voltage; at the turning point of zero, the acceleration of the elliptical ring reaches a positive acceleration peak, and the guide rail overcomes the elastic force of the pair of leaf-shaped flexible beams and the inertial force generated during the movement of the guide rail through the contact force to move with the elliptical ring; when the actuating voltage is at a low frequency, the inertial force that the guide rail needs to overcome is relatively small; with sufficient pre-stressed contact force, the guide rail follows the elliptical ring to move, and a sharp turning point of zero of the displacement of the guide rail is realized;

as the frequency of the actuating voltage increases, the positive acceleration peak of the elliptical ring increases, and the inertial force that the guide rail needs to overcome increases to follow the elliptical ring to move; at this time, there is a frequency to allow a response of the guide rail at the turning point of zero to be smoother than that of the elliptical ring; when the frequency of the actuating voltage is increased to cause the end surface of the guide rail and the front end of the elliptical ring to separate from each other in the falling phase, the elliptical ring passes the turning point of zero before the guide rail, to start a rising phase of a next cycle of the symmetrical sawtooth wave, and the guide rail is still in the falling phase of this cycle; a collision occurs between the elliptical ring in the rising phase and the guide rail in the falling phase, so that the displacement of the guide rail has a turning point of a minimum value that is sharp before reaching a zero displacement, and the guide rail follows the elliptical ring to enter the rising phase of the next cycle; and since the elliptical ring and the guide rail are in contact with each other and are not fixed, and the displacement transmission of the elliptical ring and the guide rail is complicated and related to the frequency of the actuating voltage, in the case of the preset rigidity of the pair of leaf-shaped flexible beams and the pre-stressed contact force, the frequency of the actuating voltage is adjusted, so that the response of the guide rail at the turning point of the maximum value is smoother or sharper than the response at the turning point of the minimum value, so as to drive the slider to move.

5. A method for achieving bi-directional motion of the inertial piezoelectric actuator of claim 1, when the inertial piezoelectric actuator is not energized, the slider being statically placed on the guide rail, and being in a clamp state since the gravity of the slider allows a friction to be generated between the slider and the guide rail;

a frequency of an actuating voltage being adjusted to allow a response of the guide rail at a turning point of a maximum value to be sharper than the response of the guide rail at a turning point of a minimum value, so as to make the slider move forward; the method comprising:

1) energizing the piezoelectric stack from a zero voltage to a full stroke voltage to make the guide rail to move forward; wherein a displacement of the guide rail at the turning point of the minimum value is relatively smooth, and a positive acceleration is relatively small; a static friction force received by the slider provides the inertial force to allow the slider and the guide rail to remain relatively stationary; the slider and the guide rail are relative static and move forward together; when the piezoelectric stack is energized to the full stroke voltage, the slider moves forward a first distance;

2) energizing the piezoelectric stack from the full stroke voltage to the zero voltage to make the guide rail to move backward; wherein the displacement of the guide rail at the turning point of the maximum value is relatively sharp, and a negative acceleration is relatively large; a static friction force received by the slider fails to provide the inertial force to allow the slider and the guide rail to remain relatively stationary; the slider slides on the guide rail and continuously accelerates by sliding friction until a moving speed of the slider is equal to that of the guide rail, so that the slider and the guide rail remain relatively static; when the piezoelectric stack is energized to the zero voltage, the slider moves backward a second distance;

wherein the second distance is smaller than the first distance, and a difference between the first distance and the second distance is a step distance that the slider moves forward in this cycle; and 3) repeating the steps 1-2 to allow the slider to continuously move forward;

the frequency of the actuating voltage being adjusted to allow the response of the guide rail at the turning point of the maximum value to be smoother than the response of the guide rail at the turning point of the minimum value, so as to make the slider move backward; the method comprising:

1) energizing the piezoelectric stack from a zero voltage to a full stroke voltage to make the guide rail to move forward; wherein the displacement of the guide rail at the turning point of the minimum value is relatively sharp, and the positive acceleration is relatively large; the static friction force received by the slider fails to provide the inertial force to allow the slider and the guide rail to remain relatively stationary; the slider slides on the guide rail, and continuously accelerates based on the friction until the moving speed of the slider is equal to that of the guide rail, so that the slider and the guide rail remain relatively static; when the piezoelectric stack is energized to the full stroke voltage, the slider moves forward a third distance;

2) energizing the piezoelectric stack from the full stroke voltage to the zero voltage to make the guide rail to move backward; wherein the displacement of the guide rail at the turning point of the maximum value is relatively smooth, and a negative acceleration is relatively small; a static friction force received by the slider provides the inertial force to allow the slider and the guide rail to remain relatively stationary; when the piezoelectric stack is energized to the zero voltage, the slider moves backward a fourth distance;

wherein the fourth distance is greater than the third distance, and a difference between the third distance and the fourth distance is the step distance that the slider moves backward in this cycle; and 3) repeating steps 1-2 to allow the slider to continuously move backward.

* * * * *